US011263753B2

(12) United States Patent
Larlus-Larrondo et al.

(10) Patent No.: US 11,263,753 B2
(45) Date of Patent: Mar. 1, 2022

(54) METHOD FOR TRAINING A CONVOLUTIONAL NEURAL NETWORK FOR IMAGE RECOGNITION USING IMAGE-CONDITIONED MASKED LANGUAGE MODELING

(71) Applicant: Naver Corporation, Seongnam-si (KR)

(72) Inventors: Diane Larlus-Larrondo, La Tronche (FR); Julien Perez, Meylan (FR); Mert Bulent Sariyildiz, Meylan (FR)

(73) Assignee: Naver Corporation

( * ) Notice: Subject to any disclaimer, the term of this patent is extended or adjusted under 35 U.S.C. 154(b) by 17 days.

(21) Appl. No.: 16/842,311

(22) Filed: Apr. 7, 2020

(65) Prior Publication Data
US 2021/0312628 A1  Oct. 7, 2021

(51) Int. Cl.
*G06T 7/11* (2017.01)
*G06N 3/08* (2006.01)
*G06T 7/73* (2017.01)

(52) U.S. Cl.
CPC .............. *G06T 7/11* (2017.01); *G06N 3/084* (2013.01); *G06T 7/73* (2017.01); *G06T 2207/20081* (2013.01); *G06T 2207/20084* (2013.01)

(58) Field of Classification Search
None
See application file for complete search history.

(56) References Cited

U.S. PATENT DOCUMENTS

| 10,366,166 | B2 * | 7/2019 | Yu ......................... G06N 3/0445 |
| 10,733,390 | B2 * | 8/2020 | Kalchbrenner ....... G06N 3/0472 |
| 10,936,897 | B2 * | 3/2021 | Vig ........................ G06F 40/30 |

(Continued)

OTHER PUBLICATIONS

Bengio, Yoshua, Aaron Courville, and Pascal Vincent. 'Representation Learning: A Review and New Perspectives'. IEEE Transactions on Pattern Analysis and Machine Intelligence 35, No. 8 (Aug. 2013): 1798-1828. https://doi.org/10.1 109/TPAMI.2013.50. Aug. 2013.

(Continued)

*Primary Examiner* — Bobbak Safaipour
(74) *Attorney, Agent, or Firm* — Michael J. Nickerson; Basch & Nickerson LLP

(57) ABSTRACT

A method and system pre-trains a convolutional neural network for image recognition based upon masked language modeling by inputting, to the convolutional neural network, an image; outputting, from the convolutional neural network, a visual embedding tensor of visual embedding vectors; tokenizing a caption to create a list of tokens, at least one token having visual correspondence to the image received by the convolutional neural network; randomly selecting one of the tokens in the list of tokens to be masked, the selected token being taken as ground truth; computing, using a language model neural network, hidden representations of the tokens; using the hidden representation of the masked token, as a query vector, to pool the visual embedding vectors in the visual embedding tensor, attentively; predicting the masked token by mapping the pooled visual embedding vectors to the tokens; determining a prediction loss associated with the masked token; and back-propagating the prediction loss to the convolutional neural network to tune parameters thereof.

6 Claims, 6 Drawing Sheets

(56) References Cited

U.S. PATENT DOCUMENTS

| | | | | |
|---|---|---|---|---|
| 10,949,907 | B1* | 3/2021 | Jain | G06K 9/629 |
| 11,030,414 | B2* | 6/2021 | Peters | G06F 40/30 |
| 2019/0147610 | A1* | 5/2019 | Frossard | G06T 7/90 382/103 |
| 2020/0104395 | A1* | 4/2020 | Bhatia | G06N 3/0472 |
| 2020/0107072 | A1* | 4/2020 | Lomada | H04N 21/8456 |
| 2020/0410098 | A1* | 12/2020 | Kolouri | G06K 9/6273 |
| 2020/0410361 | A1* | 12/2020 | Okajima | G06F 17/18 |
| 2021/0133585 | A1* | 5/2021 | Lee | G06K 9/6262 |

OTHER PUBLICATIONS

Bengio. Yoshua, Jérôme Louradour, Ronan Collobert, and Jason Weston. 'Curriculum Learning'. In Proceedings of the 26th Annual international Conference on Machine Learning—ICML '09, 1-8. Montreal, Quebec, Canada: ACM Press, 2009. https://doi.org/10.1145/1553374,1553380. 2009.

Caron, Mathilde, Piotr Bojanowski, Armand Joulin, and Matthijs Douze. 'Deep Clustering for Unsupervised Learning of Visual Features'. 132-49, 2018. http://openaccess.thecvf.com/content_ECCV_2018/html/Mathilde_Caron_Deep_Clustering_for_ECCV_2018_paper.htmi. 2018.

Deng, Jia, Wei Dong, Richard Socher, Li-Jia Li, Kai Li, and Li Fei-Fei, 'ImageNet: A Large-Scale Hierarchical Image Database'. In 2009 IEEE Conference on Computer Vision and Pattern Recognition, 248-55, 2009, https://doi.org/10.1109/CVPR.2009.5206848. 2009.

Devlin, Jacob, Ming-Wei Chang, Kenton Lee, and Kristina Toutanova. 'BERT: Pre-Training of Deep Bidirectional Transformers for Language Understanding', in Proceedings of the 2019 Conference of the North American Chapter of the Association for Computational Linguistics: Human Language Technologies, vol. 1 (Long and Short Papers), 4171-4186. Minneapolis, Minnesota; Association for Computational Linguistics, 2019, https://doi.org/10.18653/v1/N19-1423. 2019.

Doersch, Carl, Abhinav Gupta, and Alexei A. Efros. 'Unsupervised Visual Representation Learning by Context Prediction'. In 2015 IEEE International Conference on Computer Vision (ICCV), 1422-30, 2015. https://doi.org/10.1109/ICCV.2015.167. 2015.

Doersch, Carl, and Andrew Zisserman. 'Multi-Task Self-Supervised Visual Learning'. In 2017 IEEE International Conference on Computer Vision (ICCV), 2070-79, 2017. https://doi.org/10.1109/CCV.2017.226. 2017.

Donahue, Jeff, Trevor Darrell, and Philipp Krahenbuhi. 'Adversarial Feature Learning', 2017, 18. 2017.

Donahue. Jeff, and Karen Simonyan. 'Large Scale Adversarial Representation Learning', ArXiv: 1907.02544 [Cs, Stat], Nov. 5, 2019, http://arxiv.org/abs/1907.02544. Nov. 5, 2019.

Dosovitskiy, Alexey, Philipp Fischer, Jost Tobias Springenberg, Martin Riedmiller, and Thomas Brox. 'Discriminative Unsupervised Feature Learning with Exemplar Convolutional Neural Networks'. IEEE Transactions on Pattern Analysis and Machine Intelligence 38, No. 9 (Sep. 2016): 1734-47, https://doi.0rg/10.1109/TPAM 1.2015.2496141. Sep. 2016.

Dumoulin, Vincent, Ishmael Belghazi, Ben Poole, Alex Lamb, Martin Arjovsky, Olivier Mastropietro, and Aaron Courville. 'Adversarially Learned Inference', Nov. 4, 2016. hlips://openreview.nel/forum?id=B1EIR4cgg. Nov. 4, 2016.

Gidaris, Spyros and Nikos Komodakis. 'Generating Classification Weights With GNN Denoising Autoencoders for Few-Shot Learning'. In 2019 IEEE/CVF Conference on Computer Vision and Pattern Recognition (CVPR), 21-30, 2019. https://doi.org/10.1109/CVPR.2019.00011. 2019.

Gidaris, Spyros, Praveer Singh, and Nikos Komodakis. 'Unsupervised Representation Learning by Predicting image Rotations'. ArXiv: 1803.07728 [Cs], Mar. 20, 2018. http://arxiv.org/abs/1803.07728. Mar. 20, 2018.

Goodfellow, Ian, Jean Pouget-Abadie, Mehdi Mirza, Bing Xu, David Warde-Farley, Sherjil Ozair, Aaron Courville, and Yoshua Bengio. 'Generative Adversaria! Nets', in Advances in Neural Information Processing Systems 27, edited by Z. Ghahramani, M. Welling, G. Gortes, N. D. Lawrence, and K. Q. Weinberger, 2672-2680. Curran Associates, Inc., 2014. http://papers.nips.cc/paper/5423-generative-adversarial-nets.pdf. 2014.

Gordo, Albert, Jon Almazan, Jerome Revaud, and Diane Larlus. 'End-to-End Learning of Deep Visual Representations for image Retrieval'. ArXiv:1610.07940 [Cs], May 5, 2017. http://arxiv.org/abs/1610.07940. May 5, 2017.

Goyal, Priya. Dhruv Mahajan, Abhinav Gupta, and Ishan Misra. 'Scaling and Benchmarking Self-Supervised Visual Representation Learning'. ArXiv:1905.01235 [Cs], Jun. 6, 2019. http://arxiv.org/abs/1905.01235. Jun. 6, 2019.

He, Kaiming, Xiangyu Zhang, Shaoqing Ren, and Jian Sun. 'Deep Residual Learning for Image Recognition'. In 2016 IEEE Conference on Computervision and Pattern Recognition (CVPR), 770-78, 2016. https://doi.org/10.1109/CVPR.2016.90, 2016.

Henaff, Olivier J., Aravind Srinivas, Jeffrey De Fauw, Ali Razavi, Cari Doersch, S. M Ali Esiami, and Aaron van den Oord. 'Data-Efficient Image Recognition with Contrastive Predictive Coding'. ArXiv: 1905.09272 [Cs], Dec. 6, 2019. http://arxiv.org/abs/1905.09272. Dec. 6, 2018.

Kim. Hyunjik. and Andriy Mnih. 'Disentangling by Factorising'. ArXiv: 1802.05983 [Cs, Stat], Jul. 9, 2019. http://arxiv.org/abs/1802.05983. Jul. 9, 2019.

Kingma, Diederik P., and Jimmy Ba. 'Adam: A Method for Stochastic Optimization'. ArXiv: 1412.6980 [Cs], Jan. 29, 2017. http://afxiv.org/abs/1412.6980. Jan. 29, 2017.

Kokkinos, Iasonas, 'UberNet: Training a Universal Convolutional Neural Network for Low-, Mid-, and High-Level Vision Using Diverse Datasets and Limited Memory', in 2017 IEEE Conference on Computer Vision and Pattern Recognition (CVPR), 5454-63, 2017. https://doi.org/10.1109/CVPR.2017.579. 2017.

Kolesnikov, Alexander, Xiaohua Zhai, and Lucas Beyer. 'Revisiting Self-Supervised Visual Representation Learning', in 2019 IEEE/CVF Conference on Computer Vision and Pattern Recognition (CVPR), 1920-29. Long Beach, CA, USA IEEE, 2019. https://doi.org/10.1109/CVPR.2019.00202. 2019.

Krahenbuhl, Philipp, Carl Doersch, Jeff Donahue, and Trevor Darrell. 'Data-Dependent Initializations of Convolutional Neural Networks'. ArXiv:1511.06856 [Cs], Sep. 22, 2016. http://arxiv.org/abs/1511.06856. Sep. 22, 2016.

Krishna, Ranjay, Yuke Zhu, Oliver Groth, Justin Johnson, Kenji Hata, Joshua Kravitz, Stephanie Chen, et al. 'Visual Genome: Connecting Language and Vision Using Crowdsourced Dense Image Annotations', International Journal of Computer Vision 123, No. 1 (May 2017): 32-73. https:/doi.org/10.1007/s11263-016-0981-7. May 2017.

Krizhevsky, Alex, Ilya Sutskever, and Geoffrey E Hinton. 'ImageNet Classification with Deep Convolutional Neural Networks'. In Advances in Neural Information Processing Systems 25, edited by F, Pereira, C. J. C. Burges, L. Bottou, and K. Q Weinberger, 1097-1105, Curran Associates, Inc., 2012. http://papers.nips.co/paper/4824-imagenet-classification-with-deep-convolutional-neural-networks.pdf. 2012.

Li, Zhizhong, and Derek Hoiem. 'Learning without Forgetting'. IEEE Transactions on Pattern Analysis and Machine Intelligence 40, No. 12 (Dec. 2018): 2935-47 https://doi.org/10.1109/TPAMI.2017.2773081. Dec. 2018.

Mahajan. Dhruv, Ross Girshick, Vignesh Ramanathan, Kaiming He, Manohar Palur, Yixuan Li, Ashwin Bharambe. and Laurens van der Maalen. 'Exploring the Limits of Weakly Supervised Pretraining', in Computer Vision—ECCV 2018, edited by Vittorio Ferrari, Martial Hebert, Cristian Sminchisescu, and Yair Weiss, 11206:185-201. Cham: Springer International Publishing, 2018, https://doi.org/10,1007/978-3-030-01216-8_12, 2018.

Noroozi, Mehdi, and Paolo Favaro. 'Unsupervised Learning of Visual Representations by Solving Jigsaw Puzzles'. ArXiv: 1603.09246 [Cs], Aug. 22, 2017. http://arxiv.org/abs/1603.09246. Aug. 22, 2017.

Noroozi, Mehdi, Hamed Pirsiavash, and Paolo Favaro. 'Representation Learning by Learning to Count', in 2017 IEEE International

(56) References Cited

OTHER PUBLICATIONS

Conference on Computer Vision (ICCV), 5899-5907. Venice: IEEE, 2017. https://doi.org/10.1109/ICCV.2017.628. 2017.

Oord, Aaron van den, Yazhe Li, and Oriol Vinyals. 'Representation Learning with Contrastive Predictive Coding'. ArXiv: 1807.03748 [Cs, Stat], Jan. 22, 2019. http://arxiv.org/abs/1807.03748. Jan. 22, 2019.

Pathak, Deepak, Philipp Krahenbuhl, Jeff Donahue, Trevor Darrell, and Alexei A. Efros. 'Context Encoders: Feature Learning by inpainting'. In 2016 IEEE Conference on Computer Vision and Pattern Recognition (CVPR), 2536-44. Las Vegas, NV, USA: IEEE, 2016. https://doi.org/10.1109/CVPR.2016.278. 2016.

Radenovic, Filip, Ahmet Iscen, Giorgos Tolias, Yannis Avrithis, and Ondrej Chum. 'Revisiting Oxford and Paris: Large-Scale Image Retrieval Benchmarking'. In 2018 IEEE/CVF Conference on Computer Vision and Pattern Recognition, 5706-15. Salt Lake City, UT: IEEE, 2018. https://doi.org/10.1109/CVPR.2018.00598. 2018.

Rebuffi, Sylvestre-Alvise, Hakan Bien, and Andrea Vedaldi. 'Learning Multiple Visual Domains with Residual Adapters'. In Advances in Neural Information Processing Systems 30, edited by I. Guyon, U. V. Luxburg, S. Bengio, H. Wallach, R. Fergus, S. Vishwanathan, and R. Garnett, 506-516. Curran Associates, Inc., 2017. http://papers.nips.cc/paper/6654-learning-multiple-visual-domains-with-residual-adapters.pdf. 2017.

Rebuffi, Sylvestre-Alvise, Andrea Vedaldi, and Hakan Bilen. 'Efficient Parametrization of Multi-Domain Deep Neural Networks'. In 2018 IEEE/CVF Conference on Computer Vision and Pattern Recognition, 8119-27, 2018. https://doi.org/10.1109/CVPR.2018.00847. 2018.

Ren, Shaoqing, Kaiming He, Ross Girshick, and Jian Sun. 'Faster R-CNN: Towards Real-Time Object Detection with Region Proposal Networks'. In Advances in Neural Information Processing Systems 28, edited by C. Cortes, N. D. Lawrence, D. D. Lee, M. Sugiyama, and R. Garnett, 91-99. Curran Associates, Inc., 2015. http://papers.nips.ee/paper/5638-faster-r-cnn-towards-real-time-object-detection-with-region-proposal-networks.pdf. 2015.

Revaud, Jerome, Jon Almazan, and Rafael S Rezende. 'Learning With Average Precision: Training Image Retrieval With a Listwise Loss', n.d., 10. 2017.

Sariyildiz, Mert Bulent, and Ramazan Gokberk Cinbis. 'Gradient Matching Generative Networks for Zero-Shot Learning'. In 2019 IEEE/CVF Conference on Computer Vision and Pattern Recognition (CVPR), 2163-73, 2019. https://doi.org/10.1109/CVPR.2019.00227. 2019.

Sun, Chen, Austin Myers, Carl Vondrick, Kevin Murphy, and Cordelia Schmid. 'VideoBERT: A Joint Model for Video and Language Representation Learning'. ArXiv:1904.01766 [Cs], Sep. 11, 2019, http://arxiv.org/abs/1904.01766. Sep. 11, 2019.

Tolias, Giorgos, Ronan Sicre, and Herve Jegou. 'Particular Object Retrieval with Integral Max-Pooling of CNN Activations.' ArXiv:1511.05879 [Cs], Feb. 24, 2016. http://arxiv.org/abs/1511.05879. Feb. 24, 2016.

Tsai, Tsung Wei, Chongxuan Li, and Jun Zhu. 'Countering Noisy Labels By Learning From Auxiliary Clean Labels'. ArXiv: 1905.13305 [Cs, Stat], Sep. 12, 2019. http://arxiv.org/abs/1905.13305. Sep. 12, 2019.

Vaswani, Ashish, Noam Shazeer, Niki Parmar, Jakob Uszkoreit, Llion Jones, Aidan N Gomez, Lukasz Kaiser, and Iliia Polosukhin. 'Attention Is All You Need'. In Advances in Neural Information Processing Systems 30, edited by I. Guyon, U. V. Luxburg, S. Bengio. H. Wallach, R. Fergus, S. Vishwanathan, and R. Garnett, 5998-6008. Curran Associates, Inc., 2017. http://papers.nips.cc/paper/7181-attention-is-all-you-need.pdf. 2017.

Wu, Yonghui, Mike Schuster, Zhifeng Chen, Quoc V. Le, Mohammad Norouzi, Wolfgang Macherey, Maxim Krikun, et al. 'Google's Neural Machine Translation System: Bridging the Gap between Human and Machine Translation', ArXiv: 1609.08144 [Cs], Oct. 8, 2016. http://arxiv.og/abs/1609.08144. Oct. 8, 2016.

Yu, Zhou, Jun Yu, Yuhao Cui, Dacheng Tao, and Qi Tian. 'Deep Modular Co-Attention Networks for Visual Question Answering'. In 2019 IEEE/CVF Conference on Computer Vision and Pattern Recognition (CVPR), 6274-83, 2019. https://doi.org/10.1109/CVPR.2019.00644. 2019.

Zhai, Xiaohua, Avital Oliver, Alexander Kolesnikov, and Lucas Beyer. 'S4L: Self-Supervised Semi-Supervised Learning'. ArXiv: 1905.03670 [Cs], Jul. 23, 2019. http://arxiv.org/abs/1905.03670. Jul. 23, 2019.

Zhai, Xiaohua, Avital Oliver, Alexander Kolesnikov, and Lucas Beyer. 'Split-Brain Autoencoders: Unsupervised Learning by Cross-Channel Prediction'. In 2017 IEEE Conference on Computer Vision and Pattern Recognition (CVPR), 645-54. 2017. https://doi.org/10.1109/CVPR.2017.76. 2017.

'Split-Brain Autoencoders: Unsupervised Learning by Cross-Channel Prediction'. In 2017 IEEE Conference on Computer Vision and Pattern Recognition (CVPR), 645-54, 2017. https://doi.org/10.1109/CVPR.2017.76. 2017.

* cited by examiner

Table 1

| Method | Conv1 | Conv2 | Conv3 | Conv4 | Conv5 |
|---|---|---|---|---|---|
| ImageNet labels | 19.3 | 36.3 | 44.2 | 48.3 | 50.5 |
| Random | 11.6 | 17.1 | 16.9 | 16.3 | 14.1 |
| Random rescaled [25] | 17.5 | 23.0 | 24.5 | 23.2 | 20.6 |
| Context [6] | 16.2 | 23.3 | 30.2 | 31.7 | 29.6 |
| Context Encoders [33] | 14.1 | 20.7 | 21.0 | 19.8 | 15.5 |
| Colorization [48] | 12.5 | 24.5 | 30.4 | 31.5 | 30.3 |
| Jigsaw Puzzles [30] | 18.2 | 28.8 | 34.0 | 33.9 | 27.1 |
| BIGAN [8] | 17.7 | 24.5 | 31.0 | 29.9 | 28.0 |
| Split-Brain [49] | 17.7 | 29.3 | 35.4 | 35.2 | 32.8 |
| Counting [31] | 18.0 | 30.6 | 34.3 | 32.5 | 25.7 |
| RotNet [13] | 18.8 | 31.7 | 38.7 | 38.2 | 36.5 |
| DeepCluster [3] | 13.4 | 32.3 | 41.0 | 39.6 | 38.2 |
| (Ours) ICMLM | 19.2 | 33.6 | 41.2 | 41.3 | 41.9 |

Figure 6

Table 2

| Model | Dataset | mAP - easy | mAP - medium | mAP - hard |
|---|---|---|---|---|
| RotNet | RParis6k | 0.42 | 0.31 | 0.10 |
| (Ours) ICMLM | RParis6k | 0.53 | 0.39 | 0.14 |
| RotNet | Oxford5k | 0.23 | 0.16 | 0.02 |
| (Ours) ICMLM | Oxford5k | 0.31 | 0.20 | 0.03 |

Figure 7

METHOD FOR TRAINING A CONVOLUTIONAL NEURAL NETWORK FOR IMAGE RECOGNITION USING IMAGE-CONDITIONED MASKED LANGUAGE MODELING

BACKGROUND

Large-scale manually annotated datasets have been utilized in the deep learning approaches in computer vision. These data sources allows the training of state-of-the-art models for particular tasks of interest; e.g., image classification, object detection or scene segmentation. Furthermore, the large-scale manually annotated datasets enable high-capacity neural networks to learn transferable representations across multiple tasks.

There is a need to build more accurate and robust models as critical jobs are commended to machine learning pipelines; e.g., self-driving cars or autonomous personal assistants.

Such a transition to critical jobs requires the training of more competent models while increasing the computational complexity of neural network-based architectures. However, it is difficult and expensive to collect structured annotated data for the tasks that necessitate performing a fine-grained analysis on input images.

More specifically, it is difficult and expensive to collect annotated data for domains where such data does not exist in sufficient quantities, or for tasks that require a detailed understanding of the structure of visual scenes or a fine-grained analysis on object types and properties.

One particular example is the annotations for an object detection task that requires bounding boxes of every distinct object and concept that the detector should recognize.

An illustration of a complex scene to be annotated is depicted in FIG. 2. As illustrated in FIG. 2, the image 300 includes a house or chateau 330. The house or chateau 330 has a wall or fence 340 enclosing a garden area (not shown). The image 300 further includes evergreen trees 320 and a deciduous tree 321. As illustrated in FIG. 2, the image 300 also includes clouds 310.

To create the proper annotations for the image 300 of FIG. 2, the bounding boxes 410 of FIG. 3 are implemented around the various objects to be detected. FIG. 3 illustrates the use of bounding boxes 410 on a non-fine scale. If a finer detection is required, such as a detection of windows, doors, chimneys, etc., FIG. 3 would a greater number of bounding boxes 410. The use of these bounding boxes requires a strong supervision for training rigorous models.

Furthermore, it is desirable to train a convolutional neural network for image recognition by using models that rely on weaker supervision signals to reduce the cost of collecting annotations for individual visual tasks.

In addition, it is desirable to train a convolutional neural network for image recognition by making use of the abundant but quite noisy publicly-available knowledge bases such as social media platforms and using models that rely on weaker supervision signals to reduce the cost of collecting annotations for individual visual tasks.

BRIEF DESCRIPTION OF THE DRAWINGS

The drawings are only for purposes of illustrating various embodiments and are not to be construed as limiting, wherein:

FIG. 6 illustrates a table showing ImageNet Top-1 classification accuracy with linear layers; and FIG. 7 illustrates a table showing a comparison of the image representations learned by RotNet and image conditioned masked language modeling on the image retrieval task.

DETAILED DESCRIPTION

Figure 1:
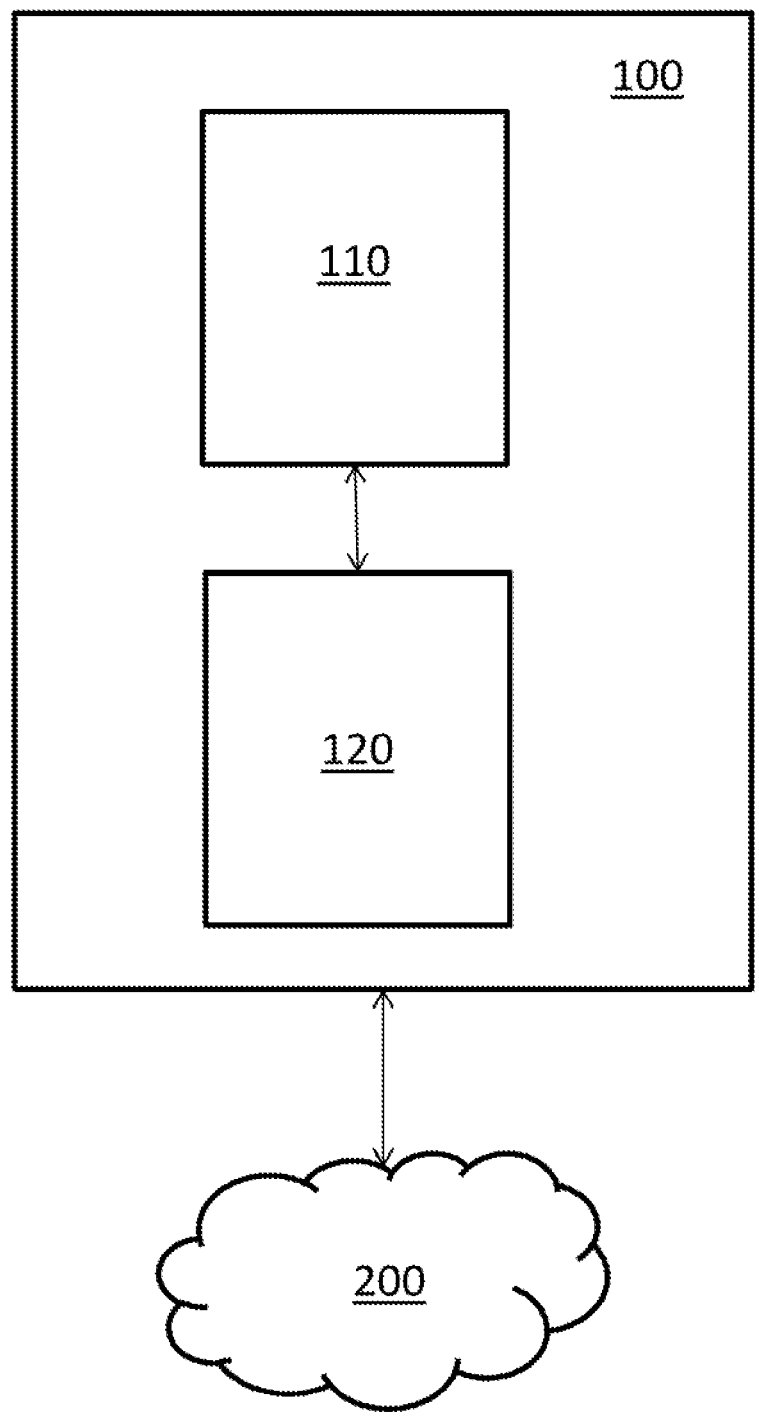
FIG. 1 illustrates an example of architecture for a method of training and a method of re-identification.
Figure 2:
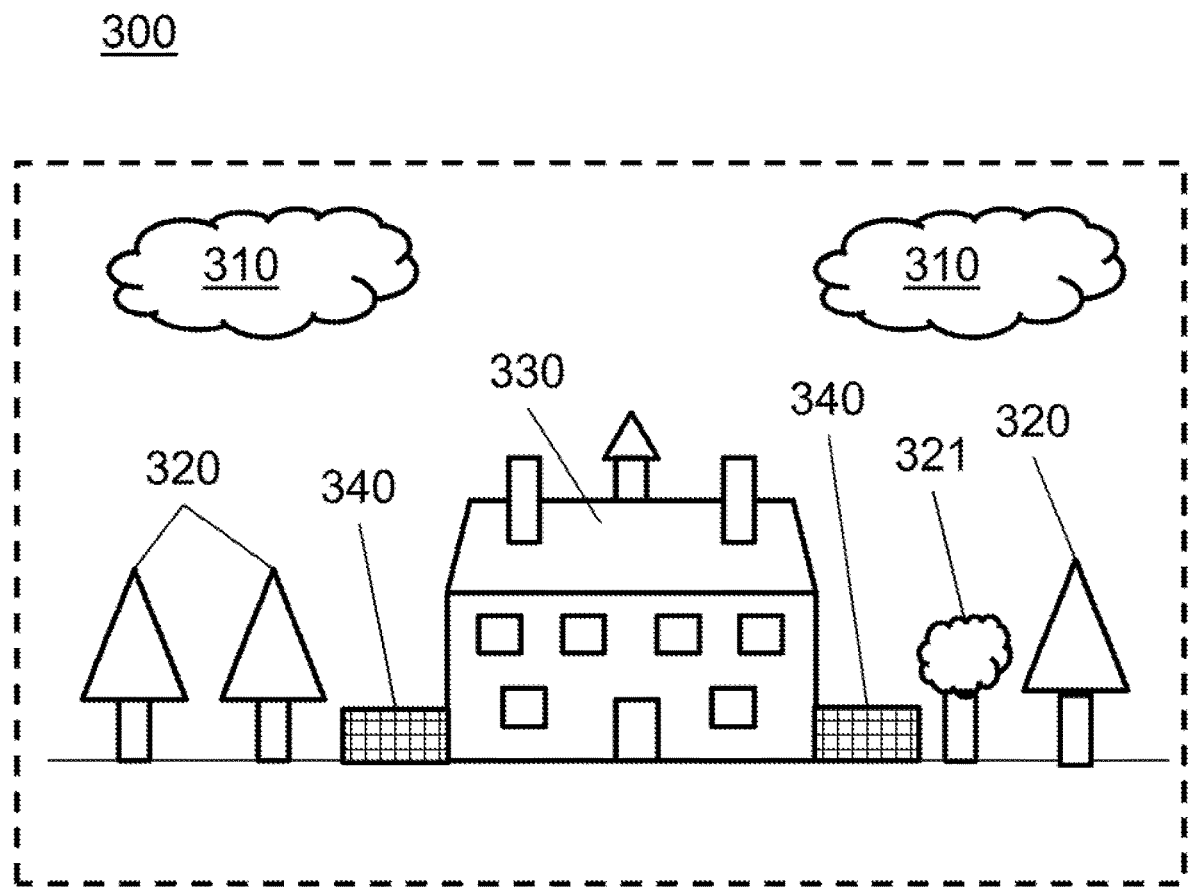
FIG. 2 illustrates an example of a complex scene to be annotated.

The methods and/or processes, described below, may be implemented within an architecture such as illustrated in FIG. 1, by means of a server 100.

In the description below, visual embeddings and visual representations are used interchangeably because these formulations are equivalent.

The server 100 is typically connected to an extended network 200 such as the Internet for data exchange. The server 100 comprises a data processor 110 and memory 120, such as a hard disk.

As noted above, it is desirable to train a convolutional neural network for image recognition by making use of the abundant but quite noisy publicly-available knowledge bases such as social media platforms.

Considering the amount of data uploaded to those platforms every day, benefiting from the data annotated by users themselves can significantly boost the performance of the models. More specifically, it has been shown that predicting hashtags of billions of social media images leads to huge improvements in the object classification task on ImageNet. Moreover, it has been shown that a VideoBERT model can be trained by collecting a large-scale video dataset out of cooking videos on the internet and including the automatically parsed annotations.

Furthermore, as noted above, it is desirable to train a convolutional neural network for image recognition by using models that rely on weaker supervision signals to reduce the cost of collecting annotations for individual visual tasks.

More specifically, unsupervised learning has been utilized in computer vision in order to learn image embedding models by solving a proxy task over a large set of freely available images. Once an embedding model is learned, it can be used to solve a list of target tasks with minimal effort.

For instance, an unsupervised proxy task can be learning the latent space of the data using auto-encoders, whereas target tasks may include supervised object (image) classification, detection or segmentation. Once a high-capacity auto-encoder is learned, its encoder network can either be used as (i) an initial state to fine-tune a separate model for each target task, or (ii) a feature extractor so that the target tasks can be solved efficiently without the burden of representation learning.

However in either case, the performance of the representations learned by the encoder network strictly depends on the objective of the proxy task. Therefore, formulating proxy tasks which capture salient representations of the input domain is required.

In other domain-specific proxy tasks utilizing self-supervised learning, a "pretext" task is solved to learn an implicit prior knowledge about the structure in the input space. The prior knowledge can be utilized in the target tasks, as discussed above. For computer vision applications, colorizing a gray-scale image, predicting image rotations, or clustering image embeddings provide useful priors to downstream vision problems. Similarly, solving next sentence prediction and masked language modeling tasks enables a language model to perform substantially better on a diverse set of natural language processing target tasks.

Although unsupervised representation learning can be beneficial, supervised learning still performs better on transfer learning by large margins. Unsupervised representation learning also requires datasets of much larger scales to compensate for the lack of annotations.

Thus, it is desirable to find alternative formulations that benefit from both paradigms, for instance under semi-supervised learning.

It is noted that image/textual description pairs are in abundance and flourish on social media platforms.

As described in more detail below, these image/textual description pairs can be utilized to train proper visual embeddings. More specifically, as described in more detail below, a proxy task, called image conditioned masked language modeling task, is utilized to teach visual embedding model objects and concepts that may appear in an image by exploiting a textual side information apprehended by a language model.

Figure 3:
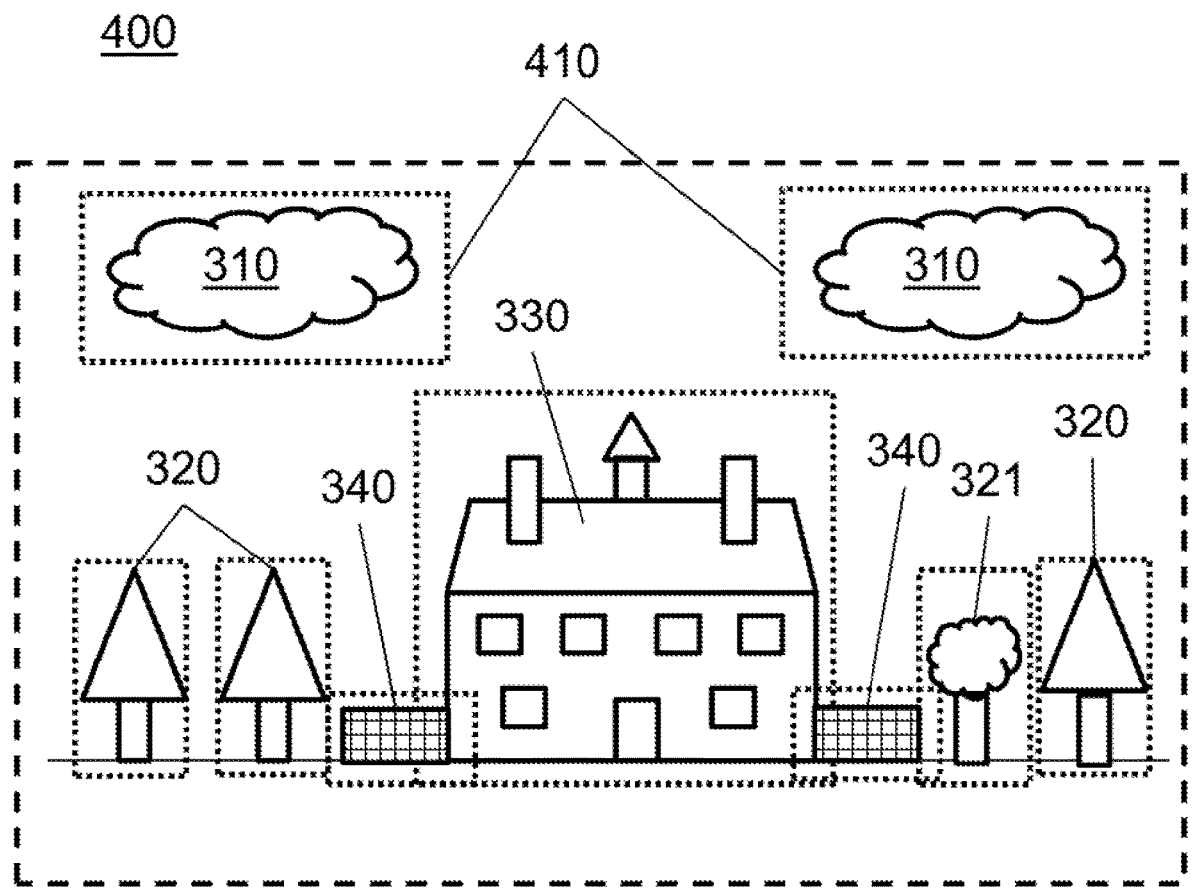
FIG. 3 illustrates the example of bounding box annotations produced for FIG. 2.

For example, the training of the visual embedding model is realized by replacing the bounding annotations in FIG. 3 with incomplete textual descriptions, such as "It is cloudy," "The house is old," "There is a beautiful chateau among the trees," "The trees on the left are evergreen," "The lone maple tree is panted to the East of the house," or "The chateau has a walled garden."

When utilizing image conditioned masked language modeling, two modules, working on different modalities, are employed: a pre-trained language model and a visual recognition model. By using these modules, the semantic structure in natural language is exploited for the purpose of visual scene understanding.

For example, given a dataset composed of image-caption pairs, image conditioned masked language modeling solves a masked language modeling task on the captions of the dataset. However, instead of predicting masked words based on the language prior and the dataset bias, image conditioned masked language modeling makes its predictions by looking at the image associated with the caption.

More specifically, given an image-caption pair, a word in the caption is masked, and the image conditioned masked language modeling tries to predict the label of the masked word by using the representation of the image.

As noted above, to train a visual embedding model in order to learn efficient, transferable representations that can be used across variety of vision tasks, an image conditioned masked language modeling-based proxy task is utilized. In image conditioned masked language modeling, the masked language modeling task is solved by using visual information, as will be described in more detail below.

To better understand image conditioned masked language modeling, how masked language modeling is applied to natural language expressions will be briefly explained.

Figure 4:
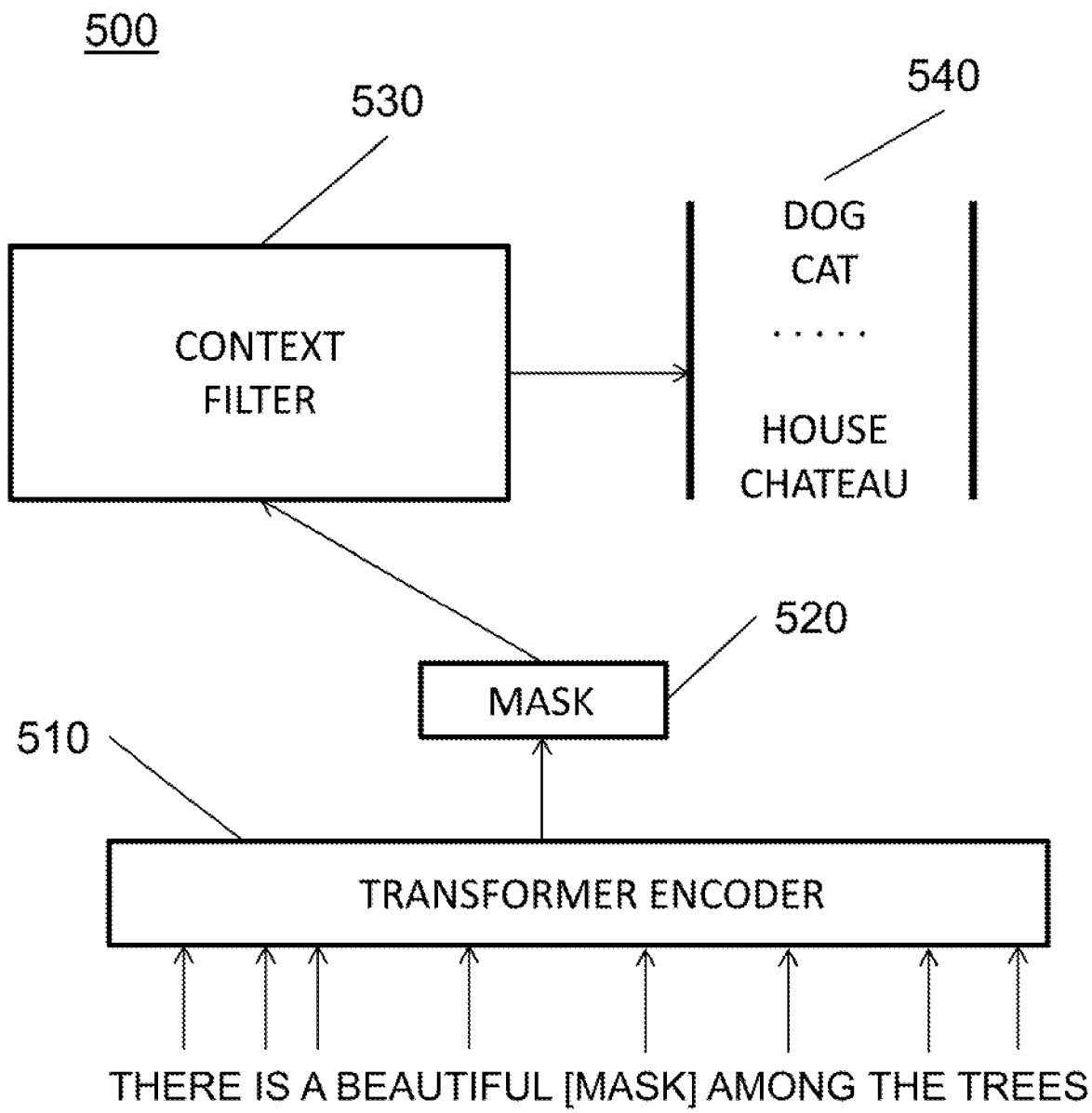
FIG. 4 illustrates a block diagram of a complete chain of a masked language modeling task solved in a Bidirectional Encoder Representations from Transformers (BERT) model.

Masked language modeling is a self-supervised proxy task to pre-train a language model over large-scale text corpora. This type of pre-training scheme enables the language model to learn efficient language priors so that simply fine-tuning the language model achieves significant improvements over the state-of-the-art on a wide range of natural language processing target tasks In this pre-training task, (i) a sequence of words are tokenized, (ii) a random subset of the tokens are selected to be either masked, replaced by other tokens, or kept intact, (iii) all of the tokens are given as input to a language model (a bidirectional transformer encoder model), and (iv) the language model is trained to correctly predict the ground-truth labels of the selected tokens (before the tokens are masked or replaced, in case they are changed). FIG. 4 illustrated the architecture to carry out this pre-training task.

As illustrated in FIG. 4, a set of tokens representing "There is a beautiful chateau among the trees," wherein the token for chateau is masked, is inputted into transformer encoder 510 to create a contextualized representation of the masked token (520). The contextualized representation of the masked token (520) is inputted into a context filter 530, such as BERT (described in Delvin et al. in "Bert: Pre-training of deep bidirectional transformers for language understanding"), to generate word predictions 540.

Having explained masked language modeling applied to natural language expressions with respect to FIG. 4, image conditioned masked language modeling will now be described in more detail.

The pre-training task utilizes a dataset that contains image-caption pairs:

$$\mathcal{D} = \{(I_i, \{c_{i,j}\}_{j=1}^{m_i})_{i=1}^{N}\}$$

where $I_i$ is an image and $$\{c_{i,j}\}_{j=1}^{m_i}$$

is a set of $m_i$ captions of the scene $I_i$.

In the pre-training process, two neural network modules: a fully-convolutional neural network (F-CNN) (660 of FIG. 5) based image embedding model $\Phi_{\theta_{CNN}}(\cdot)$ and a pre-trained language model (LM) $\psi_{\theta_{LM}}(\cdot)$, where $\theta_{CNN}$ and $\theta_{LM}$ are the parameters of the F-CNN and LM, respectively.

The image embedding model $\Phi_{\theta_{CNN}}(\cdot)$ takes as input an RGB image $I_i$ (300 of FIG. 5) and outputs a H×W×C dimensional image embedding tensor (670 of FIG. 5); i.e., $\Phi_{\theta_{CNN}}(I) \in R^{H \times W \times C}$, where H and W denote the height and width of a spatial grid of C-dimensional visual feature vectors.

On the other hand, pre-trained language model (LM) $\psi_{\theta_{LM}}(\cdot)$ (610 of FIG. 5) takes, as input, a list of tokens $[t_1, \ldots, t_T]^{i,j}$, which are obtained by tokenizing a caption $c_{i,j}$ (THERE IS A BEAUTIFUL [MASK] AMONG THE TREES of FIG. 5, wherein the masked token is "chateau") and outputs D-dimensional contextualized representations of the tokens $[\psi_{\theta_{LM}}(t_1) \ldots, \psi_{\theta_{LM}}(t_T)]^{i,j}$ (620 of FIG. 5), where $\psi_{\theta_{LM}}(t_T) \in R^D$.

In image conditioned masked language modeling, each caption $$\{c_{i,j}\}_{j=1}^{m_i}$$

annotated for an image $I_i$ describes at least one particular action or object appearing in the image $I_i$. In other words, it can be assumed that there is at least one token in caption $c_{i,j}$ that has visual correspondence in image $I_i$. Then one of the tokens can be masked and try to predict the token's label by using visual features $\Phi_{\theta_{CNN}}(I_i\cdot)$ extracted from $I_i$. This way, by back-propagating the token prediction loss to the visual embedding model $\Phi_{\theta_{CNN}}(\cdot)$, the parameters $\theta_{CNN}$ can be tuned.

More specifically, given an image-caption pair $(I_i, c_{i,j})$, the learning problem in image conditioned masked language modeling is defined as follows. Initially, input representations from both modalities are extracted. The caption $c_{i,j}$ is tokenized into $[t_1, t_T]_{i,j}$. One of the tokens is randomly selected $t_m \in [t_1, \ldots, t_T]^{i,j}$.

The identification of the selected token $y_{t_m}$ (i.e., the index of the selected token in the token vocabulary) is taken as a ground-truth. Then $t_m$ is replaced with "[MASK]". The hidden representations of the tokens $[\psi_{\theta LM}(t_1) \ldots, \psi_{\theta LM}(t_T)]^{i,j}$, where $\psi_{\theta LM}(t_t) \in R^D$ are computed by the language model.

Figure 5:
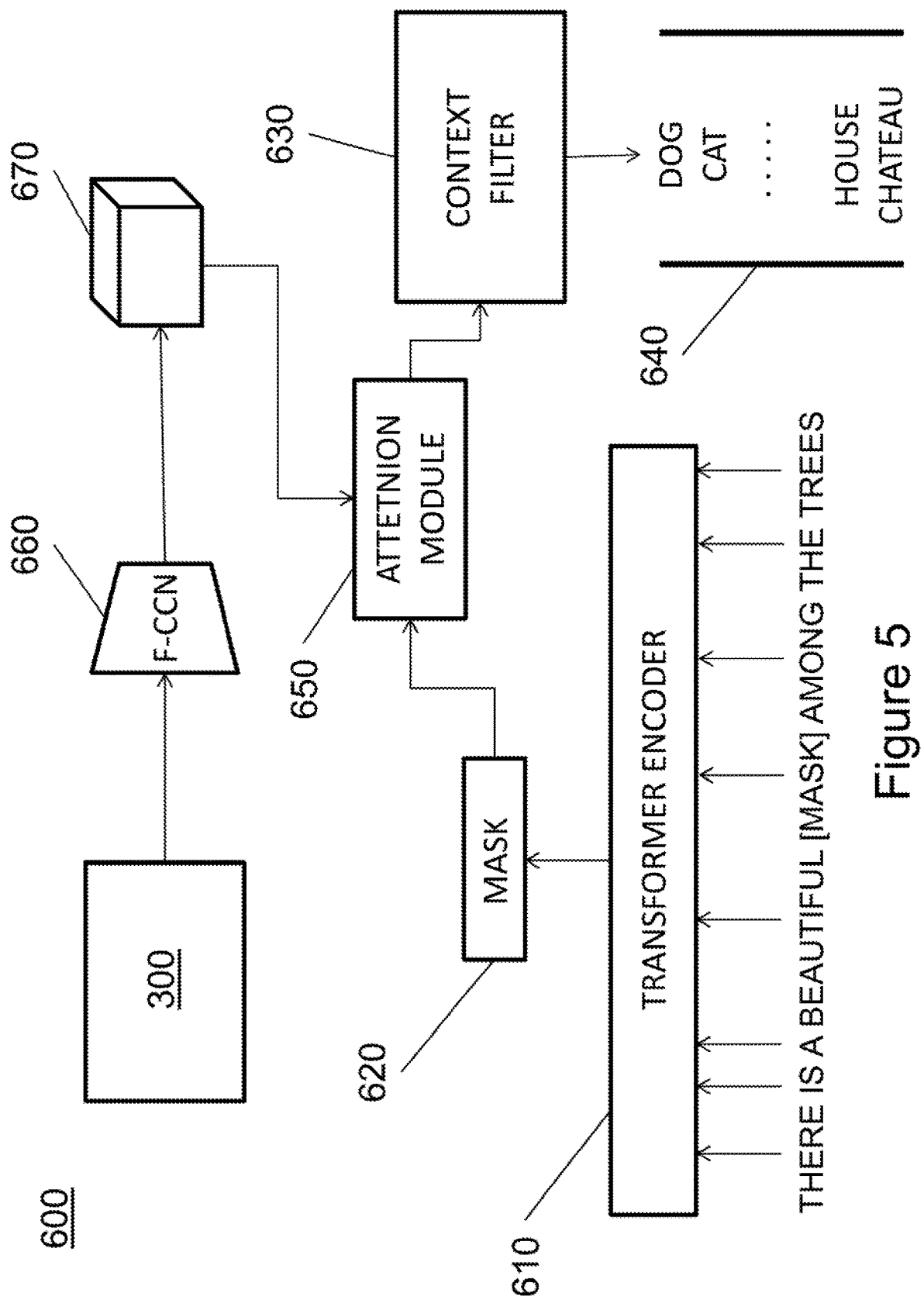
FIG. 5 illustrates a block diagram of a complete chain of an image conditioned masked language modeling used in training a convolutional neural network for image recognition.

In parallel, the visual embedding tensor of the image $\Phi_{\theta CNN}(I) \in R^{H \times W \times C}$ is computed by the F-CNN (660 of FIG. 5).

In one embodiment, the hidden representation of the masked token $\psi_{\theta LM}(t_m)$ may be used as a query vector to pool the visual embedding tensor $\Phi_{\theta CNN}(I_i \cdot)$ attentively.

This process is a spatial attention mechanism over the grid of visual embedding vectors $\Phi_{\theta CNN}(I_i \cdot)$ where the attention scores are conditioned on the hidden representation of the masked token $\psi_{\theta LM}(t_m)$, as will be explained in more detail below. Finally, the visual embedding vector pooled by the attention module (650 of FIG. 5) is mapped to the token vocabulary to predict the label of the masked token $\hat{y}_{t_m}$ The above process is carried out to train the F-CNN (660 of FIG. 5) by providing the F-CNN (660 of FIG. 5) with reliable side information extracted from textual data. To carry out the training, one can use a pre-trained bidirectional transformer encoder model such as BERT as language model. Other language models could have been used. To benefit from the language prior learned by BERT while training the F-CNN: (i) the parameters of BERT ($\theta_{LM}$) are frozen, (ii) the pooled visual embedding vector are mapped to the token vocabulary space using a context filter (630 of FIG. 5) and the token embeddings that are parts of the pre-trained BERT model.

It is noted that BERT models are trained by solving two self-supervised pretext tasks (masked language modeling and next sentence prediction tasks); therefore, the training does not necessitate any additional manual annotation.

In image conditioned masked language modeling, what to teach $\Phi_{\theta CNN}(I_i \cdot)$ can be selectively chosen by restricting the tokens that are masked during training. This type of flexible control over the learning procedure by determining in advance a list of maskable tokens can have multiple benefits.

First, tokens that are ambiguous to detect in images; e.g., "about," "beautiful," or "support" can be removed. By removing these tokens, the noisy learning signal resulting from predicting vague concepts can be filtered and, hence, stabilize the training.

Second, a curriculum learning-based approach can be adopted for token selection where the maskable tokens are dynamically updated during the course of training.

In the end, the objective that is minimized is the following log-likelihood:

$$\theta^{\star}_{CNN}, \theta^{\star}_{ATT} = \underset{\theta \in \{\theta_{CNN}, \theta_{ATT},\}}{\mathrm{argmin}} - \sum_{i=1}^{N} \sum_{j=1}^{m_i} \sum_{t \in \{c_{i,j} \cap \mathcal{M}\}} \log p(y_{i_{t_m}} \mid I_i, c_{i,j}, t),$$

where $\theta_{ATT}$ are trainable parameters that may possibly be used in the attention mechanism (650 of FIG. 5) and M is a set of maskable tokens.

In summary, a masked token in a caption associated to an image is predicted by directly "looking at" the image; i.e., the masked token is predicted by using only the visual information coming from the fully-convolutional neural network. The C-dimensional visual feature vectors lying on a spatial grid of size W×H extracted from the F-CNN are attended by conditioning on the contextualized hidden representation of the masked token extracted from BERT. Finally, the attended (pooled) visual feature vector are projected onto the token embedding space learned by BERT.

The following is a description of computing attention over the visual embedding vectors.

To model textual sequences for natural language processing applications, one particular self-attention scheme, called scaled dot product attention, has been used. It is noted that other attention mechanisms can be used.

In the scaled dot product attention scheme, at each layer of the transformer architecture, a D-dimensional key k, query q and a value v vectors are computed for each token in the input sequence. Then an attention score of token $t_a$ with respect to token $t_b$ is computed as:

$$s_{att}(t_a, t_b) = \frac{q_a k_b}{\sqrt{D}},$$

where $q_a$ and $k_b$ are query and key vectors in $R^D$ computed for tokens $t_a$ and $t_b$ at a certain layer of the network, respectively. Based on the pairwise attention scores between each token in the input sequence, contextualized representations of the tokens are computed as:

$$\gamma(Q, K, V) = \mathrm{softmax}\left(\frac{QK^T}{\sqrt{D}}\right)V,$$

where Q, K, V are queries, keys, and values in $R^{T \times D}$ that are computed for all tokens at a certain layer of the network.

This has been extended to build guided attention units for the purpose of visual question answering. In a guided attention unit, attention scores are computed between hidden representations of tokens coming from a long short-term memory model and frozen visual embedding vectors of a ResNet101-backboned Fast R-CNN models. To do that key and value vectors are computed by token representations and query vectors are computed by image representations. This way, the token representations are contextualized by querying the visual information.

Although visual question answering and image conditioned masked language modeling tasks are similar regarding the data modalities and the tasks being solved, the above-described training follows a different approach.

Instead of using a pre-trained visual embedding model and training a language model to learn multi-modal representations for the visual question answering task, a visual embedding model is trained by using a pre-trained language model to learn visual representations for the image conditioned masked language modeling task. Therefore, the pool visual representations are pooled by querying the contextualized representation of the masked tokens.

More specifically, the query vector q is the hidden representation of the masked token in caption $c_{i,j}$ computed by a pre-trained BERT model. The key and value vectors are computed by mapping the output of the F-CNN to the token representation space of the BERT model using two different convolutional neural blocks $\rho_{\theta K}$ and $\rho_{\theta V}$, where $\theta_K$ and $\theta_V$ are the trainable parameters of these blocks; i.e., $\theta_{ATT} = \{\theta_K$ U $\theta_V$}. These blocks are used: (i) to compute the scaled-dot-product-attention scores between the visual embedding vectors and the representation of the masked token, their dimension must match, (ii) to decouple the representations learned by the image embedding model $\Phi_{\theta_{CNN}}(I_i\cdot)$ and the mapping from the visual embedding space to the token representation space, and (iii) as F-CNN outputs a spatial grid of visual embeddings vectors, by using the convolutional transformations, to get an array of vectors to obtain:

$$q = \psi_{\theta_{LM}}(t_m) \in \{\psi_{\theta_{LM}}([t_1, \ldots, t_T]^{i,j})\}$$
$$K = \rho_{\theta_K}(\phi_{\theta_{CNN}}(I_i))$$
$$V = \rho_{\theta_V}(\phi_{\theta_{CNN}}(I_i))$$
$$\gamma(q, K, V) = \text{softmax}\left(\frac{q^T K^T}{\sqrt{D}}\right)V,$$

where $q \in R^D$ is the hidden representation of the masked token that is used as the query vector, K and V are keys and values in $R^{M \times D}$ computed by the convolutional blocks (to make the notation simpler, it is assumed that convolutional blocks flatten a W×H dimensional spatial grid into an array of size M=W×H) and $\gamma(q, K, V)$ now produces the contextualized visual embeddings in $R^D$ obtained by querying the masked token representation.

Finally, $\gamma(q, K, V)$ is mapped to the token vocabulary space as explained above. During training, $\theta_{CNN}$, $\theta_K$, and $\theta_V$ are tuned by optimizing token prediction loss defined in Equation 1 as:

$$\theta^\star_{CNN}, \theta^\star_{ATT} = \underset{\theta \in \{\theta_{CNN}, \theta_{ATT},\}}{\arg\min} -\sum_{i=1}^{N}\sum_{j=1}^{m_i}\sum_{t \in \{c_{i,j} \cap M\}} \log p(y_{t_m} \mid I_i, c_{i,j}, t),$$

The common practice to evaluate a model regarding its abilities to learn efficient image representations has three considerations The first consideration is related to the spectrum of target tasks: Can representations be generalized across a wide range of target tasks? For instance, are the representations learned by an auto-encoder useful for tasks ranging from object classification to surface estimation or visual navigation?

The second and third considerations are related to the number of parameters and annotated training samples required to achieve the desired performance: Can a model achieve the same performance level on a particular target task using a computationally cheaper architecture, or much less annotated data?

In order to benchmark models based on these fundamental aspects, several target tasks have been proposed including object classification, detection and segmentation, image retrieval, or few-shot learning.

As a way to learn efficient image representations by means of gathering a prior knowledge about the visual world, self-supervised proxy tasks have been proposed as a form of unsupervised learning.

In the following tests, the image conditioned masked language modeling has been compared with unsupervised learning-based approaches for the following reasons.

First, the proxy and the target tasks that are solved to train and evaluate the visual embedding models are disjoint. In image conditioned masked language modeling, visual embedding models are trained by solving the masked word prediction task guided by a pre-trained language model. Then the representations learned by the visual embedding models are evaluated on the other intrinsically different vision tasks; e.g., as object classification or image retrieval.

In that sense, even though the additional textual input (although it is noisy and incomplete) is used, image conditioned masked language modeling is trained in an unsupervised manner with respect to the target tasks.

Second, the abundant image-caption pairs found on the internet can be a potential source of weak supervision to overcome the data annotation bottleneck. Therefore, image conditioned masked language modeling is an alternative way to train visual embedding models where this abundant weak supervision for vision tasks can be exploited.

Third, unsupervised learning approaches have naturally established benchmark protocols to evaluate image representations on a list of vision tasks. By directly experimenting on these protocols, the gain brought by image conditioned masked language modeling can be measured.

In the testing, $\Phi_{\theta_{CNN}}$, $\rho_{\theta_K}$ and $\rho_{\theta_V}$ modules are over the (image, region description) tuples provided in the Visual Genome dataset. Visual Genome contains 108,077 images and 5.4 million region descriptions. Each region description is about a particular interaction between a sub-set of objects in an image and comes with a bounding box and a caption annotations. Since the goal is to exploit incomplete weak supervision for the purpose of training an F-CNN, in the experiments the bounding box annotations are discarded.

For these experiments, the region descriptions which occupy less than 10% or more than 90% of the area in an image are removed. Then WordPiece tokenization is applied and the sequences whose length is less than 3 or more than 15 are removed. A list of maskable tokens is constructed out of the most common 2000 nouns and adjectives in captions. While doing that, since the objective is to predict the label of a masked token, nouns and adjectives, which tokenizes into a single piece, are selected.

The nouns and adjectives are parsed into descriptions. After preprocessing both region descriptions and maskable words, the dataset has roughly 1 million region descriptions and 1246 maskable words. Hence, the Equation 1 turns into a 1246-way classification problem over the (image, region description) pairs. Two sets of 50k region descriptions among the remaining ones are randomly taken to construct validation and test sets.

To be consistent, the image embedding model $\Phi_{\theta_{CNN}}$, an AlexNet-like convolutional neural network are used, where there is a BatchNorm2D layer in each convolutional layer. In the tests, an AlexNet checkpoint pre-trained on ImageNet is loaded with the rotation prediction task. However, since the visual features are pooled by using the attention mechanism as explained above, the last max pooling and fully-connected layers from the AlexNet are removed.

$\rho_{\theta_K}$ and $\rho_{\theta_V}$ blocks are built by using two Conv2D-BatchNorm2D-ReLU layers and a linear Conv2D layer afterwards. Each Conv2D layer has 3×3 kernels and 512 channels, except the last linear Conv2D where it has 768 channels which is the dimension of the token representations in BERT model. Besides, in order for $\rho_{\theta_K}$ and $\rho_{\theta_V}$ to understand the spatial configuration of the visual feature vectors, one-hot positional embeddings are concatenated to the visual feature vectors $\Phi_{\theta_{CNN}}(I_i\cdot)$ before feeding them into $\rho_{\theta_K}$ and $\rho_{\theta_V}$ blocks. All trainable parameters in the model are tuned by performing 100k SGD updates with batches of size 256, using ADAM optimizer with learning rates $5 \times 10^{-5}$ and $5 \times 10^{-4}$ for the parameters in $\Phi_{\theta_{CNN}}$ and $[\rho_{\theta_K} \rho_{\theta_V}]$ networks, respectively. Linear learning rate decay is applied during training.

The image conditioned masked language modeling was compared with several state-of-the-art self-supervised learning approaches on the object classification task over the ILSVRC-2012 challenge dataset. The standard evaluation procedure on this task involves extracting image representations from pre-trained models and training logistic regression classifiers on top of the frozen representations. Since there are five convolutional layers in AlexNet, frozen representations are computed at the output of each convolutional layer and then spatially resized such that the representations at each layer become roughly 9k-dimensional. Following that, at each branch a flattening and a BatchNorm2D and fully-connected layers are appended, and these newly added parameters are trained by performing SGD updates for 35 epochs over the training set of ILSVRC-2012 dataset.

To compute the performance on this task, a publicly shared repository is used. All the approaches that are compared use an AlexNet-like architecture like the image conditioned masked language modeling.

The image representations extracted from the AlexNet architecture trained by the image conditioned masked language modeling leads to significant improvements compared to the self-supervised learning approaches. By comparing RotNet and image conditioned masked language modeling, a clear advantage of exploiting language prior for learning transferable representations is realized. Moreover, although the number of convolutional layer parameters may substantially larger in the AlexNet than in DeepCluster, image conditioned masked language modeling enables the learning of more generic representations especially for AlexNet. With this regard, training a F-CNN with image conditioned masked language modeling is more efficient than with DeepCluster.

FIG. 6 shows Table 1 illustrating ImageNet Top-1 classification accuracy with linear layers. All approaches in Table 1 use AlexNet-like architectures in the models. The first and the second parts of Table 1 are the upper and lower bounds on this benchmark.

The image conditioned masked language modeling and RotNet were tested on the image retrieval task. As opposed to a class-level categorization task, this task favors intra-class variations by benchmarking models in terms of capturing fine-grained details in images.

To evaluate the representations learned by both models, the convolutional layers of an AlexNet are taken and a generalized-mean pooling, L2 normalization, and fully-connected layers are appended. The parameters of the fully-connected layer are trained for 300 epochs by minimizing the AP Loss over the clean version of the Landmarks dataset. The complete model is tested on the revisited Oxford Buildings and Paris datasets by computing mean-average-precision scores. The image representations that are produced by solving the image conditioned masked language modeling task outperforms the counterparts obtained by the RotNet model on this task. The results are provided in Table 2 of FIG. 7.

The distractors were selected by randomly choosing the distractors from the distractor set and adding the selected distractors to the gallery set.

A comparison of the trained models with the previous state-of-the-art results reported for this expanded dataset. Both versions (r and b) of the trained model significantly outperform the state of the art (y), as presented in FIG. 4.

In summary, a method for pre-training a convolutional neural network for image recognition using a Siamese architecture, wherein a first branch of the Siamese architecture is a convolutional neural network that produces visual representations and a second branch of the Siamese architecture is a language model neural network that produces textual representations, comprises (a) solving an image conditioned masked language modeling task using a masked token from the language model neural network and using visual representations of the image produced by the convolutional neural network; the solving an image conditioned masked language modeling task including (a1) calculating prediction losses of the image conditioned masked language modeling task, and (a2) training the convolutional neural network by back propagating the prediction losses to the convolutional neural network.

A method of pre-training a convolutional neural network for image recognition based upon masked language modeling, comprising (a) inputting, to the convolutional neural network, an image; (b) outputting, from the convolutional neural network, a H×W×C dimensional image embedding tensor, where H and W denote a height and width of a spatial grid of C-dimensional visual feature vectors; (c) tokenizing a caption to create a list of tokens, at least one token having visual correspondence to the image received by the convolutional neural network; (d) masking one of the tokens in the list of tokens; (e) predicting the masked token using the visual feature vectors of the H×W×C dimensional image embedding tensor; (f) determining a prediction loss associated with the masked token; and (g) back-propagating the prediction loss to the convolutional neural network to tune parameters thereof.

A method of pre-training a convolutional neural network for image recognition based upon masked language modeling, comprising (a) inputting, to the convolutional neural network, an image; (b) outputting, from the convolutional neural network, a visual embedding tensor of visual embedding vectors; (c) tokenizing a caption to create a list of tokens, at least one token having visual correspondence to the image received by the convolutional neural network; (d) randomly selecting one of the tokens in the list of tokens to be masked, the selected token being taken as ground truth; (e) computing, using a language model neural network, hidden representations of the tokens; (f) using the hidden representation of the masked token, as a query vector, to pool the visual embedding vectors in the visual embedding tensor, attentively; (g) predicting the masked token by mapping the pooled visual embedding vectors to the tokens; (h) determining a prediction loss associated with the masked token; and (i) back-propagating the prediction loss to the convolutional neural network to tune parameters thereof.

The visual embedding tensor of visual feature vector may be a H×W×C dimensional image embedding tensor, where H and W denote a height and width of a spatial grid of C-dimensional visual embedding vectors.

The pooled visual feature vectors may be mapped to the token vocabulary space using a context filter.

The predicting of the masked token may use a spatial attention mechanism over the grid of visual embedding vectors, wherein attention scores are conditioned on the hidden representation of the masked token.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A method for pre-training a convolutional neural network for image recognition using a Siamese architecture, wherein a first branch of the Siamese architecture is a convolutional neural network that produces visual representations and a second branch of the Siamese architecture is a language model neural network that produces textual representations, comprising:
   (a) solving an image conditioned masked language modeling task using a masked token from the language model neural network and using visual representations of the image produced by the convolutional neural network;
   said solving an image conditioned masked language modeling task including,
      (a1) calculating prediction losses of the image conditioned masked language modeling task, and
      (a2) training the convolutional neural network by back propagating the prediction losses to the convolutional neural network.

2. A method of pre-training a convolutional neural network for image recognition based upon masked language modeling, comprising:
   (a) inputting, to the convolutional neural network, an image;
   (b) outputting, from the convolutional neural network, a H×W×C dimensional image embedding tensor, where H and W denote a height and width of a spatial grid of C-dimensional visual feature vectors;
   (c) tokenizing a caption to create a list of tokens, at least one token having visual correspondence to the image received by the convolutional neural network;
   (d) masking one of the tokens in the list of tokens;
   (e) predicting the masked token using the visual feature vectors of the H×W×C dimensional image embedding tensor;
   (f) determining a prediction loss associated with the masked token; and
   (g) back-propagating the prediction loss to the convolutional neural network to tune parameters thereof.

3. A method of pre-training a convolutional neural network for image recognition based upon masked language modeling, comprising:
   (a) inputting, to the convolutional neural network, an image;
   (b) outputting, from the convolutional neural network, a visual embedding tensor of visual embedding vectors;
   (c) tokenizing a caption to create a list of tokens, at least one token having visual correspondence to the image received by the convolutional neural network;
   (d) randomly selecting one of the tokens in the list of tokens to be masked, the selected token being taken as ground truth;
   (e) computing, using a language model neural network, hidden representations of the tokens;
   (f) using the hidden representation of the masked token, as a query vector, to pool the visual embedding vectors in the visual embedding tensor, attentively;
   (g) predicting the masked token by mapping the pooled visual embedding vectors to the tokens;
   (h) determining a prediction loss associated with the masked token; and
   (i) back-propagating the prediction loss to the convolutional neural network to tune parameters thereof.

4. The method as claimed in claim 3, wherein the visual embedding tensor of visual feature vector is a H×W×C dimensional image embedding tensor, where H and W denote a height and width of a spatial grid of C-dimensional visual embedding vectors.

5. The method as claimed in claim 3, wherein the pooled visual feature vectors are mapped to the token vocabulary space using a context filter.

6. The method as claimed in claim 4, wherein said predicting the masked token uses a spatial attention mechanism over the grid of visual embedding vectors, wherein attention scores are conditioned on the hidden representation of the masked token.

* * * * *